3,322,843
TREATMENT OF PARAFFINIC FRACTIONS
John E. Frandolig and John C. Staton, Baytown, Tex., assignors, by mesne assignments, to Esso Research and Engineering Company, Elizabeth, N.J., a corporation of Delaware
No Drawing. Filed Apr. 13, 1964, Ser. No. 359,483
15 Claims. (Cl. 260—676)

The present invention is directed to treatment of paraffins containing small quantities of contaminants. More particularly, the invention is concerned with treatment of normal paraffinic fractions containing trace amounts of contaminants. In its more specific aspects, the invention is concerned with treatment of paraffinic hydrocarbons in the presence of hydrogen to remove contaminating compounds.

The present invention may be briefly described as a method for treating a paraffinic hydrocarbon fraction having 9 to 20 carbon atoms in the molecule, which is contaminated with polar compounds, such as phenols and carbonyls, and with unsaturated hydrocarbons, such as olefins and aromatics, and may be contaminated also with sulphur, color bodies, nitrogen and the like. In the practice of the present invention, the contaminated fraction is contacted in the presence of free hydrogen with a catalyst such as a Group VI or Group VIII metal or a mixture of Group VI and Group VIII metals. The Group VI and Group VIII metals are the metals in the "Periodic Arrangement of the Elements" by Mendeleeff, found on page 308 of the Handbook of Chemistry and Physics, 25th ed., Chemical Rubber Publishing Co., Cleveland, 1941. The contacting operation is conducted at a temperature within the range of about 300° F. to about 400° F. when the catalyst is a Group VIII metal; and the contacting is conducted at a temperature within the range of about 500° F. to about 750° F. when the catalyst is a Group VI metal or contains a Group VI metal.

The paraffinic hydrocarbon fraction is preferably a normal paraffin fraction which is obtained by separating normal paraffins from its mixtures with other hydrocarbons, such as isoparaffins and the like, using a molecular sieve as an adsorbent. Separation of normal paraffins from isoparaffins employing molecular sieves is a well-known process and further details thereof need not be given here. However, the product produced from such a process may contain contaminating compounds which interfere with the use of the product, particularly where the paraffin is employed as a feedstock to an alkylation process for producing biodegradable detergent alkylates. As an example of the contaminating compounds, reference is had to Table I where typical inspection characteristics and analyses are given of a $C_{11}$ to $C_{14}$ a paraffinic feed and product fed into and recovered from a treating operation in accordance with the present invention.

Although Table I shows typical inspection characteristics and analyses of the feed and product, it is not intended that the invention be confined to such specific feeds, or to feeds containing the specific contaminants or specific amounts of the contaminants.

As a general statement, the paraffinic hydrocarbon fraction may suitably boil within the range from about 250° F. to about 650° F. Preferably, the paraffinic hydrocarbon may boil within the range from about 400° F. to about 600° F.

The catalyst employed in the practice of the present invention is suitably a Group VI metal catalyst, such as chromium, molybdenum, and tungsten; while the Group VIII metal catalyst may include iron, cobalt, nickel, palladium, and platinum.

When these catalysts are employed in the practice of the present invention, they may be used as the oxides supported on a suitable support, such as alumina. For example, the catalyst may be termed cobalt molybdate, which is a mixture of oxides of cobalt and molybdenum. Ordinarily, the catalyst, such as cobalt molybdate, may contain from about 2% to about 10% by weight of cobalt oxide, and about 10% to about 20% by weight of molybdenum trioxide on alumina. Small amounts of sodium oxide, iron and silicon dioxide may be present. The so-called molybdate may be pretreated prior to employment, such as by sulfiding with a 0.4% by weight solution of carbon disulfide in normal hexane at a temperature of 625° F. and 560 p.s.i.g. pressure at about 1 v./v./hr. in the presence of about 750 s.c.f of hydrogen The Group VIII metal oxides, such as nickel oxide, may also be suitably pretreated with a hydrogen gas mixture or a hydrogen-rich gas. Ordinarily, the Group VIII metal, such as nickel, may be present in an amount of about 2% to about 60% by weight of active nickel on a suitable support, such as kieselguhr or alumina.

In practicing the present invention, the fraction being treated may be passed over the catalyst arranged in a suitable bed at temperatures within the range of about 300° F. to about 400° F. when the catalyst is a Group VIII metal, such as nickel. The paraffin hydrocarbon may also be contacted with the catalyst suspended in it as a slurry, or the so-called fluidized solids technique may be used in the contacting operation. When the catalyst is a Group VI metal or a mixture of a Group VI metal and a Group VIII metal, the fraction may be contacted with the metal arranged in a bed at a temperature within the range of about 500° F. to about 750° F. Regardless of the catalyst employed, a space velocity within the range of about 0.5 to about 5.0 volumes of paraffin hydrocarbon per hour per volume of catalyst is charged. Pressures are within the range of about 500 to about 1000 p.s.i.g. The amount of hydrogen employed is suitably from about 200 to about 2000 s.c.f. of hydrogen per barrel of the fraction.

TABLE I

|  | $C_{11}$–$C_{14}$ Paraffin Feed | | Products | |
|---|---|---|---|---|
|  |  |  | Nickel | Cobalt Molybdate |
| APHA [1] color | 0 | 15 | 0 | 0 |
| APHA [1] colorhold (16 hrs. at 212° F.) | 15 | 30 | 0 | 0 |
| Wt. percent olefins | 0.333 | 0.360 | 0.039 | 0.037 |
| Wt. percent aromatics | 1.1 | 1.3 | 0.0 | 0.27 |
| P.p.m. phenols | 550 | 670 | 3.4 | 0.9 |
| P.p.m. thiophenols | 12 | 21 | 0.7 | 0.1 |
| P.p.m. carbonyls | 17 | 21 | 0.0 | 0.0 |
| P.p.m. total nitrogen | 7 | 12 | 0.0 | 1.0 |
| P.p.m. total sulphur | 17 | 20 | 1.0 | 1.0 |

[1] American Public Health Association.

The present invention involves a molecular sieve operation where virgin petroleum naphtha fractions, such as those having 9 to 20 carbon atoms, are treated to separate normal paraffins from other hydrocarbons. The normal paraffin fraction may then be suitably distilled in a fractional distillation zone to produce a fraction such as one having from about 11 to 14 carbon atoms and predominately normal paraffins. These fractions then may be treated with hydrogen over the Group VIII metal catalysts on a support, such as alumina, or over a supported Group VI metal catalyst.

Suitable conditions for use with a catalyst mixture of a Group VIII metal catalyst and a Group VI metal catalyst, such as cobalt molybdate, are as follows: a temperature of 625° F., a pressure ranging from about 350 to about 660 p.s.i.g., a space velocity of 0.5 to 4 volumes of liquid per hour per volume of catalyst, and 750 s.c.f. of hydrogen per barrel of liquid feed.

Conditions suitable for use where a Group VIII metal catalyst (such as a nickel catalyst) is used include a temperature from about 300° F. to about 400° F., a pressure of about 660 p.s.i.g., a space velocity of about 0.5 to about 4 volumes of liquid per hour per volume of catalyst, and 750 s.c.f. of hydrogen per barrel of liquid feed.

While it is preferred to use a sequence where the paraffinic fraction is subjected first to molecular sieve separation, and is then fractionally distilled and then contacted with free hydrogen in the presence of a catalyst, it is contemplated that the fractional distillation step may follow the hydrogen treating step whereby several streams of improved quality which are substantially free from contaminants may be obtained. Likewise, the molecular sieve separation step may follow the fractional distillation step or the hydrogen treatment step, or both of these steps. It will be preferred, however, to use the hydrogen treatment step after the molecular sieve separation and optionally before or after fractional distillation.

In order to illustrate the present invention further, normal paraffin fractions produced in a sequence involving molecular sieve separation, fractional distillation, and hydrogen treatment in accordance with the present invention, is compared with the products resulting from treatment of paraffins from a molecular sieve operation with an adsorbent such as Porocel and with strong sulfuric acid, such as oleum. The following Table II presents a comparison of these several operations:

invention and the performance of the product in the present invention is superior to that of the prior art treatments. The performance characteristic or number is a measure of the satisfactory utilization of the paraffin on alkylation and thus is indicative of the quality of the product.

The present invention is quite important and useful in that it is possible to produce pure paraffinic hydrocarbons which are eminently suitable for production of biodegradable detergents. The product of the present invention may be used for other purposes where pure paraffins are required, such as diluents for catalytic reactions, solvents employed in foodstuff processing operations, paint thinners, dry cleaning solvents, and the like.

The nature and objects of the present invention having been completely described and illustrated and the best mode contemplated set forth, what we wish to claim as new and useful and secure by Letters Patent is:

1. A method for obtaining a substantially pure normal paraffin fraction which comprises treating a paraffinic hydrocarbon fraction containing paraffins and isoparaffins with a molecular sieve to separate and recover from said paraffinic hydrocarbon fraction a normal paraffin fraction which is contaminated with phenols, carbonyls, olefins, nitrogen, sulphur, color bodies, and aromatics, and then contacting said normal paraffin fraction with a catalyst selected from the group consisting of Group VI and Group VIII metals and mixtures of Group VI and Group VIII metals in the presence of free hydrogen under suitable temperature conditions to substantially remove said contaminants and to form a purified product.

2. A method in accordance with claim 1 in which the Group VIII metal is nickel and the Group VI metal comprises molybdenum.

3. A method in accordance with claim 1 in which the normal paraffin fraction is fractionally distilled prior to said contacting.

4. A method in accordance with claim 1 in which the normal paraffin is fractionally distilled subsequent to said contacting.

5. A method in accordance with claim 1 in which the catalyst is nickel.

6. A method in accordance with claim 1 in which the catalyst is cobalt molybdate.

7. A method in accordance with claim 1 in which the normal paraffin fraction contains 11 to 14 carbon atoms.

TABLE II.—ANALYTICAL AND PROCESSABILITY DATA OF $C_{11}$-$C_{14}$ NORMAL PARAFFINS

| Item No. | Description of Treatment | Phenols,[1] p.p.m. | Carbonyls,[2] p.p.m. | Olefins,[3] Wt. Percent | Nitrogen,[4] p.p.m. | Sulphur, p.p.m. | Wt. Percent Aromatics | | Performance,[5] Avg. Percent |
|---|---|---|---|---|---|---|---|---|---|
| | | | | | | | U.V. | M.S. | |
| 1 | Nickel hydrogenation, 2 v./hr./v. 750 s.c.f./bbl. $H^2$, 350° F., 660 p.s.i.g. | 3.4 | 0.0 | 0.039 | 0 | 2 | 0.0 | 0.0 | ~100 |
| 2 | Cobalt molybdate hydrogen treating, 2 v./hr./v., 750 s.c.f./bbl. $H^2$, 625° F., 660 p.s.i.g. | 0.9 | 0 | 0.037 | 1 | 1 | 0.27 | | ~100 |
| 3 | Porocel percolated, 5 v./v., 20/60 mesh | 0.5 | 0.0 | 0.219 | <1 | 3 | 0.1 | 0.8 | 98.3 |
| 4 | $C_9$-$C_{16}$, 10 lb./bbl. oleum treat, followed by $C_{11}$-$C_{14}$ heart cutting. | 12 | 13 | 0.180 | | 4 | 0.4 | 0.5 | ~97 |
| 5 | Untreated | 650 | 20 | 0.333 | 11 | 20 | 1.3 | 1.4 | 86.8 |

[1] Weight p.p.m. as an average molecular weight phenol.
[2] Carbonyls as weight p.p.m. C=O.
[3] Olefins by Bromine Index, ASTM D-1491 plus Benzene.
[4] Total nitrogen, modified Kjeldahl on acid extract from 200 gram sample.
[5] Relative scale as a function of conversion and yield on alkylation.

In Table II, Items 1 and 2 represent the present invention; whereas, Item 5 is the feedstock, and Items 3 and 4 show the effect of an adsorbent and the sulfuric acid.

The foregoing data show that the contaminants are substantially removed in accordance with the present 8. A method in accordance with claim 1 in which said contacting is conducted at a space velocity within the range of about 0.5 to about 5 volumes of normal paraffin per hour per volume of catalyst, at a pressure within the range of about 500 to about 1000 p.s.i.g., and in the presence of about 200 to about 2000 s.c.f. of hydrogen per barrel of said fraction.

9. A method in accordance with claim 1 in which the catalyst is supported on alumina.

10. A method in accordance with claim 1 in which the purified product is fractionally distilled to recover a fraction having 11 to 14 carbon atoms.

11. A method in accordance with claim 1 in which the metal is selected from Group VIII and the contacting is conducted at a temperature within the range of about 300° to about 400° F.

12. A method in accordance with claim 1 in which the metal is selected from Group VI and mixtures of Group VI and VIII and the contacting is conducted at a temperature within the range of about 500° F. to about 750° F.

13. A method in accordance with claim 1 in which the normal paraffin fraction contains 9 to 20 carbon atoms in the molecule.

14. A method for obtaining a substantially pure normal paraffin fraction which comprises treating a paraffinic hydrocarbon fraction containing paraffins and isoparaffins with a molecular sieve to separate and recover from said paraffinic hydrocarbon fraction a normal paraffin fraction having 9 to 20 carbon atoms in the molecule which is contaminated with carbonyls, olefins, nitrogen, sulfur, color bodies, and aromatics, and then contacting said fraction with a catalyst selected from the group consisting of the Group VI metals and mixtures of Group VI and Group VIII metals in the presence of free hydrogen at a temperature within the range of about 500° F. to about 750° F. to substantially remove said contaminants and to form a purified product.

15. A method for obtaining a substantially pure normal paraffin fraction which comprises treating a paraffinic hydrocarbon fraction containing paraffins and isoparaffins with a molecular sieve to separate and recover from said paraffinic hydrocarbon fraction a normal paraffin fraction having 9 to 20 carbon atoms in the molecule which is contaminated with carbonyls, olefins, nitrogen, sulfur, color bodies, and aromatics, and then contacting said fraction with a catalyst selected from the Group VIII metals in the presence of free hydrogen at a temperature within the range of about 300° F. to about 400° F.

References Cited

UNITED STATES PATENTS

| | | | |
|---|---|---|---|
| 1,973,833 | 9/1934 | Wietzel et al. | 260—676 |
| 2,073,578 | 3/1937 | Gwynn | 208—217 |
| 2,121,998 | 6/1938 | Tilton | 260—676 |
| 2,134,333 | 10/1938 | Jahrstorfer et al. | 260—676 |
| 2,436,923 | 3/1948 | Haensel | 260—676 |
| 2,560,415 | 7/1951 | Cornell | 208—217 |
| 2,587,987 | 3/1952 | Franklin | 208—217 |
| 2,900,322 | 3/1956 | Northcott et al. | 208—216 |
| 2,921,022 | 1/1960 | Sowerwine | 208—217 |
| 3,055,824 | 9/1962 | Squires et al. | 208—217 |
| 3,242,101 | 3/1966 | Erickson et al. | 260—667 |

ALPHONSO D. SULLIVAN, *Primary Examiner.*